US008712182B2

(12) United States Patent (10) Patent No.: US 8,712,182 B2
Iso et al. (45) Date of Patent: Apr. 29, 2014

(54) IMAGE PROCESSING DEVICE, IMAGE PROCESSING METHOD, AND PROGRAM

(75) Inventors: Daisuke Iso, Tokyo (JP); Teppei Kurita, Tokyo (JP); Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 171 days.

(21) Appl. No.: 13/425,155

(22) Filed: Mar. 20, 2012

(65) Prior Publication Data

US 2012/0250993 A1 Oct. 4, 2012

(30) Foreign Application Priority Data

Mar. 29, 2011 (JP) ................................. 2011-071541

(51) Int. Cl.
*G06K 9/40* (2006.01)
*G06T 5/00* (2006.01)
(52) U.S. Cl.
CPC ................. *G06T 5/001* (2013.01); *G06T 5/002* (2013.01); *G06T 5/003* (2013.01); *G06T 5/004* (2013.01); *G06T 5/005* (2013.01)
USPC .......................................... 382/269; 382/254
(58) Field of Classification Search
USPC .................................. 382/162–167, 254, 269
See application file for complete search history.

(56) References Cited

U.S. PATENT DOCUMENTS

| 5,638,463 | A | * | 6/1997 | Ohshita | 382/195 |
|---|---|---|---|---|---|
| 5,781,666 | A | * | 7/1998 | Ishizawa et al. | 382/284 |
| 5,781,899 | A | * | 7/1998 | Hirata | 382/305 |
| 5,815,605 | A | * | 9/1998 | Koike | 382/269 |
| 5,929,906 | A | * | 7/1999 | Arai et al. | 348/223.1 |
| 6,636,635 | B2 | * | 10/2003 | Matsugu | 382/218 |
| 6,980,324 | B1 | * | 12/2005 | Iida | 358/1.9 |
| 7,443,543 | B2 | * | 10/2008 | Kaburagi | 358/3.15 |
| 7,912,312 | B2 | * | 3/2011 | Hsieh et al. | 382/269 |
| 8,059,135 | B2 | * | 11/2011 | Naganuma | 345/597 |
| 2002/0044691 | A1 | * | 4/2002 | Matsugu | 382/218 |
| 2004/0126033 | A1 | * | 7/2004 | Ishizaka | 382/254 |
| 2005/0025383 | A1 | * | 2/2005 | Domingo et al. | 382/266 |
| 2005/0041870 | A1 | * | 2/2005 | Reichenbach et al. | 382/198 |
| 2005/0083552 | A1 | * | 4/2005 | Kaburagi | 358/2.1 |
| 2006/0119897 | A1 | * | 6/2006 | Morikawa | 358/3.27 |
| 2007/0172142 | A1 | * | 7/2007 | Hsieh et al. | 382/269 |
| 2012/0163730 | A1 | * | 6/2012 | Washio | 382/269 |
| 2013/0223756 | A1 | * | 8/2013 | Iketani | 382/260 |

FOREIGN PATENT DOCUMENTS

| JP | 2004-234623 | 8/2004 |
|---|---|---|
| JP | 2009-70123 | 4/2009 |
| JP | 2010-67272 | 3/2010 |

* cited by examiner

*Primary Examiner* — Alex Liew
(74) *Attorney, Agent, or Firm* — Sherr & Jiang, PLLC

(57) ABSTRACT

An image processing device includes an image estimation unit that estimates an image prior to the jaggedness occurrence from a jaggedness-occurring image and generates an estimated image prior to the jaggedness occurrence, and a weighting/adding unit that selects a jaggedness-occurring area as a processing target area in the estimated image prior to the jaggedness occurrence, detects a similar area that is a pixel area and similar to the processing target area, and then computes a weight according to the degree of similarity of each detected similar area to the processing target area, and detects a corresponding area in the jaggedness-occurring image to the processing target area and the similar area, and then computes a corrected pixel value of the processing target area of the jaggedness-occurring image through a weighting/adding process to which the weight of a pixel value of the detected corresponding area is applied.

19 Claims, 8 Drawing Sheets

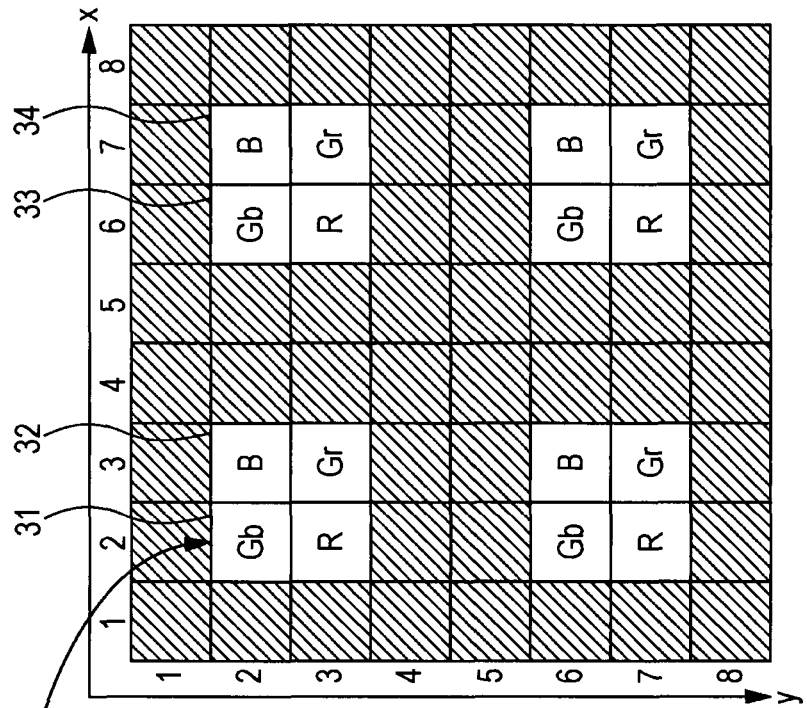

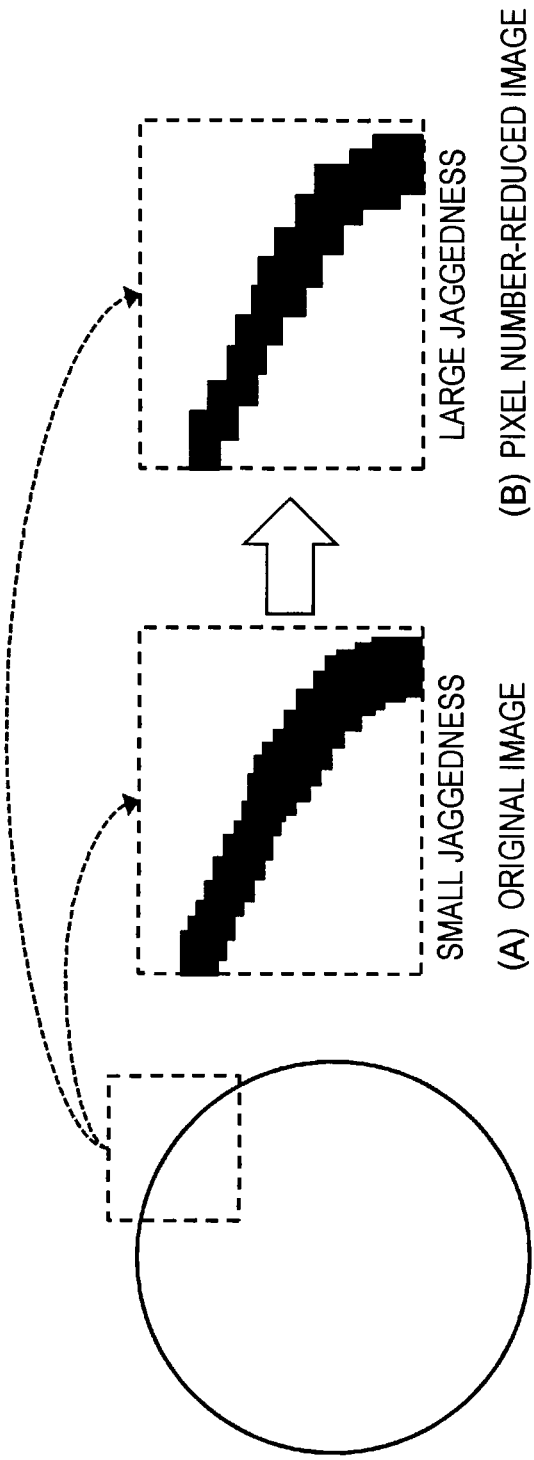

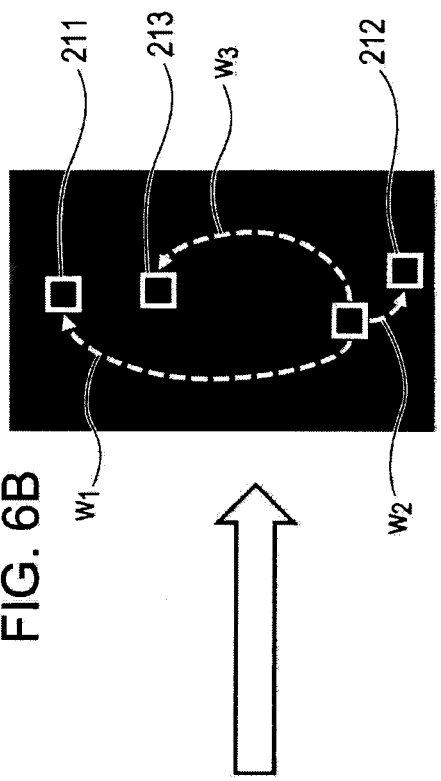
FIG. 6A
FIG. 6B
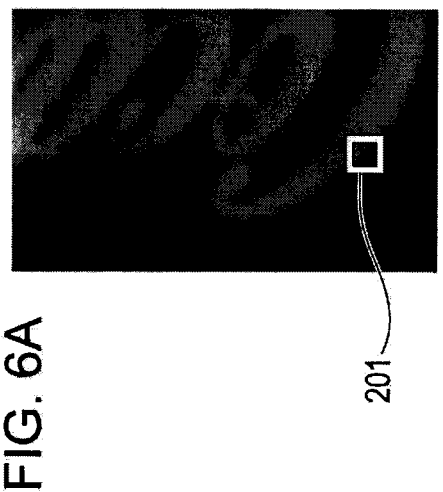
FIG. 6C
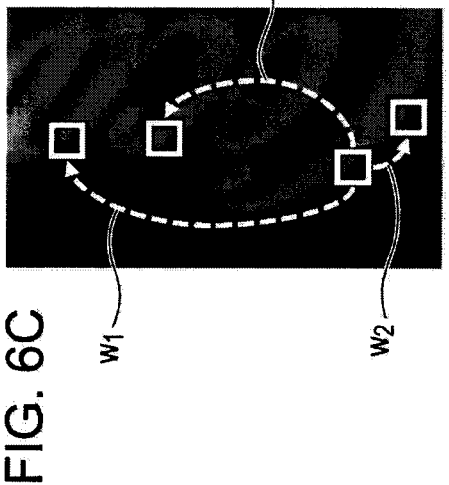
FIG. 6D

IMAGE PROCESSING DEVICE, IMAGE PROCESSING METHOD, AND PROGRAM

BACKGROUND

The present disclosure relates to an image processing device, an image processing method, and a program. Particularly, the present disclosure relates to an image processing device, an image processing method, and a program for performing processing so as to reduce jaggedness that occurs in images.

When an image captured by a camera is output for printing or displaying, for example, there is a case where the image of an object is output with step-like jagged contours, different from the original contours of the object.

The step-like jagged shape is generally called "jaggedness". The Jaggedness is one kind of fold-over noise, and various proposals for image processing to reduce such jaggedness have been made in the related art.

Japanese Unexamined Patent Application Publication No. 2010-67272, for example, discloses a technique in which direction determination is performed based on edge detection, and smoothing components in a direction parallel further to the edge is heavily weighted and blending to each direction is performed so as to achieve the reduction of jaggedness.

However, the technique has a problem in that resolution deteriorates because, if edge preservation smoothing is performed using pixels of which centroids are deviated, smoothing is shown in pixels that are deviated in the vertical direction to the edge in a sub-pixel unit.

In addition, Japanese Unexamined Patent Application Publication No. 2009-070123 discloses a technique of suppressing emphasized jaggedness by using a super resolution technique and making a low-resolution image in the periphery of edges have high resolution.

However, there is a problem in the super resolution technique in that the amount of calculation is enormous, and therefore, it is difficult to realize the technique in a small-scale circuit.

Furthermore, Japanese Unexamined Patent Application Publication No. 2004-234623 discloses a technique of generating a high quality image with reduced jaggedness by adjusting positions of images that are consecutively captured and overlapping the images.

However, the technique has a problem in that the edges are blurred simply with slight deviation in the position adjustment, thereby causing deterioration in resolution.

In addition, there is another problem in that it is very difficult to accurately calculate position deviation between images taking both a global motion, which is motion information of the entire images, and a local motion, which is motion information of some images, into consideration, and therefore, it is difficult to enhance resolution in all areas in the images.

SUMMARY

It is therefore desirable for the present disclosure to provide an image processing device, an image processing method, and a program that realize reduction of jaggedness with a simple configuration.

According to an embodiment of the present disclosure, there is provided an image processing device including an image estimation unit that estimates an image prior to the jaggedness occurrence from a jaggedness-occurring image and generates an estimated image prior to the jaggedness occurrence, and a weighting/adding unit that selects a jaggedness-occurring area as a processing target area in the estimated image prior to the jaggedness occurrence, detects a similar area that is a pixel area and similar to the processing target area, and then computes a weight according to the degree of similarity of each detected similar area to the processing target area, and detects a corresponding area in the jaggedness-occurring image to the processing target area and the similar area, and then computes a corrected pixel value of the processing target area of the jaggedness-occurring image through a weighting/adding process to which the weight of a pixel value of the detected corresponding area is applied.

Furthermore, according to the embodiment of the present disclosure, the image estimation unit may input a luminance image generated from the jaggedness-occurring image and generate an estimated luminance image prior to the jaggedness occurrence, and the weighting/adding unit may compute the weight based on the estimated luminance prior to the jaggedness occurrence, and execute a weighting/adding process of pixel values to which the weight for the luminance image generated from the jaggedness-occurring image is applied.

Furthermore, according to the embodiment of the present disclosure, the image estimation unit may generate an estimated image prior to the jaggedness occurrence through a Bayes' estimation process to which preliminary learning data is applied.

Furthermore, according to the embodiment of the present disclosure, the image estimation unit may generate an estimated image prior to the jaggedness occurrence through a smoothing process for the jaggedness-occurring image.

Furthermore, according to the embodiment of the present disclosure, the image estimation unit may generate an estimated image prior to the jaggedness occurrence through a Bayes' estimation process to which statistical data of feature amounts expressing an edge is applied as preliminary learning data.

Furthermore, according to the embodiment of the present disclosure, the weighting/adding unit may execute a weighting/adding process to which an NL-Means (Non-Local-Means) method is applied.

Furthermore, according to the embodiment of the present disclosure, the weighting/adding unit may execute a weighting/adding process to which a Joint Bilateral Filter method is applied.

Furthermore, according to the embodiment of the present disclosure, the image processing device further may include a filtering process unit that generates corrected color difference information by executing a correlation process in application of the Joint Bilateral Filter (JBF), setting a jaggedness-reduced luminance image having a corrected pixel value computed by the weighting/adding unit to a reference image.

Furthermore, according to the embodiment of the present disclosure, the image processing device may further include a blending process unit that blends the jaggedness-reduced luminance image having a corrected pixel value computed by the weighting/adding unit and a jaggedness-occurring luminance image generated based on a jaggedness-occurring image prior to correction in accordance with a weight corresponding to an edge of an image.

Furthermore, according to another embodiment of the present disclosure, there is provided an image processing method for executing image processing in an image processing device, including estimating an image prior to the jaggedness occurrence from a jaggedness-occurring image and generating an estimated image prior to the jaggedness occurrence by an image estimation unit, and selecting a jaggedness-occurring area as a processing target area in the estimated image prior to the jaggedness occurrence, detecting a similar area that is a pixel area and similar to the processing target area, and then computing a weight according to the degree of similarity of each detected similar area to the processing target area, and detecting a corresponding area in the jaggedness-occurring image to the processing target area and the similar area, and then computing a corrected pixel value of the processing target area of the jaggedness-occurring image through a weighting/adding process to which the weight of a pixel value of the detected corresponding area is applied, by a weighting/adding unit.

Furthermore, according to still another embodiment of the present disclosure, there is provided a program that causes an image processing device to execute image processing, including estimating an image prior to the jaggedness occurrence from a jaggedness-occurring image and generating an estimated image prior to the jaggedness occurrence in an image estimation unit, and selecting a jaggedness-occurring area as a processing target area in the estimated image prior to the jaggedness occurrence, detecting a similar area that is a pixel area and similar to the processing target area, and then computing a weight according to the degree of similarity of each detected similar area to the processing target area, and detecting a corresponding area in the jaggedness-occurring image to the processing target area and the similar area, and then computing a corrected pixel value of the processing target area of the jaggedness-occurring image through a weighting/adding process to which the weight of a pixel value of the detected corresponding area is applied, in a weighting/adding unit.

Furthermore, the program of the present disclosure is a program, for example, that can be provided in a recording medium or a communication medium that is provided in a form of being readable in a computer for an information processing device or a computer system that can execute various program codes. By providing such a program in a form of being readable in a computer, processing by an information processing device or a computer according to such a program is realized.

Other objectives, characteristics, and advantages of the present disclosure may be clarified with further detailed description based on embodiments of the present disclosure to be described later and accompanying drawings. Furthermore, a system referred in the present specification is a logically assembled configuration of a plurality of devices, and is not limited to one obtained by accommodating devices of each configuration in the same housing.

According to the configuration of the embodiments of the present disclosure, it is possible to generate a high-quality image with reduced jaggedness occurring on the image.

Specifically, in the image estimation unit, an image prior to jaggedness occurrence is generated from a jaggedness-occurring image based on, for example, Bayes' estimation, and in the weighting/adding unit, a jaggedness-occurring area is selected as a processing target area in the generated estimated image prior to the jaggedness occurrence, a similar area that is a pixel area and similar to the processing target area is detected, and then a weight is computed according to the degree of similarity of each detected similar area to the processing target area, and a corresponding area in the jaggedness-occurring image to the processing target area and the similar area is detected, and then a corrected pixel value of the processing target area of the jaggedness-occurring image is computed through a weighting/adding process to which the weight of a pixel value of the detected corresponding area is applied. Through the above process, an image with reduced jaggedness is generated.

BRIEF DESCRIPTION OF THE DRAWINGS

FIGS. 1A and 1B are diagrams illustrating a problem in a pixel number reduction process;

FIG. 3 is a diagram illustrating occurrence of jaggedness as a problem of the pixel number reduction process;

FIGS. 6A to 6D are diagrams illustrating an example of generating a jaggedness-reduced image by a weighted mean based on the degree of similarity;

DETAILED DESCRIPTION OF EMBODIMENTS

Figure 2A:
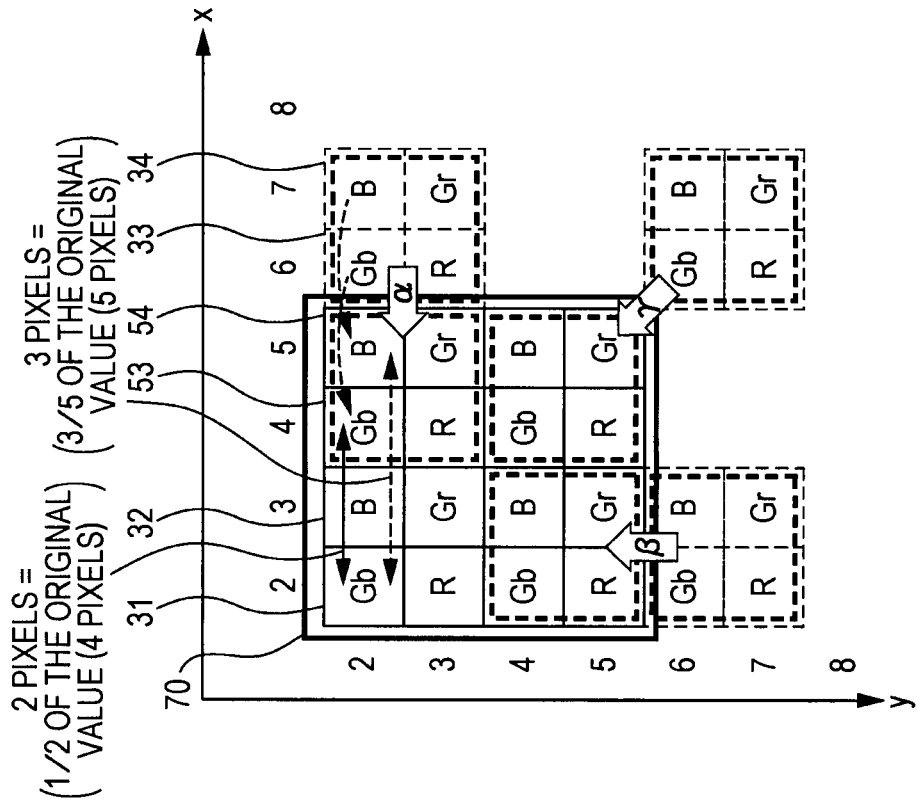
FIGS. 2A and 2B are diagrams illustrating the problem in the pixel number reduction process.

Hereinafter, an image processing device, an image processing method, and a program of the present disclosure will be described in detail with reference to drawings. Furthermore, description will be provided in accordance with the following items.

1. Regarding Occurrence of Jaggedness in Image
2. Regarding Configuration and Process of Image Processing Device
   2-1. (Process 1) Color conversion process from an RGB image to a luminance image and color difference information
   2-1. (Process 2) Process of estimating a luminance image prior to the jaggedness occurrence based on a luminance image with jaggedness already occurred using Bayes' Estimation
   2-3. (Process 3) Process of reducing jaggedness with NL-Means by obtaining the degree of similarity from an estimated luminance image
   2-4. (Process 4) Process of blending the edge area of jaggedness-reduced image by Process 3 and portions other than the edge area of the original image
   2-5. (Process 5) Generation of corrected color difference information based on a correlation process by JBF in which jaggedness-reduced luminance image is referred to for a color difference image
   2-6. (Process 6) Luminance-color difference synthesis process
3. Regarding Configuration Example of Image Processing Device
4. Summary of Configuration of Present Disclosure

[1. Regarding Occurrence of Jaggedness in Image]

As described earlier, when an image captured by a camera is output for printing or displaying, there is a case where the image of an object included in the output image has step-like jagged contours, different from the original contours thereof. The jagged shape is generally called "jaggedness".

Such jaggedness occurs when, for example, an output image with the reduced number of pixels is generated by performing a thinning-out process or a synthesizing process for pixels in an image captured using a high resolution image element with a large number of pixels.

Most imaging devices in recent years have included an imaging element having an extremely large number of pixels, which is several millions to tens of millions, in order to capture images with high resolution.

However, such situations occur in which a display device that can output a high resolution image corresponding to the number of pixels that an imaging element has is seldom used, and memory capacity for recording increases if the high resolution image output from the imaging element is recorded in the memory without change, resulting in the reduced number of recordable images.

Considering the above situations, there are many cases where, in an imaging device including an imaging element with a large number of pixels, a process of reducing the total number of pixels and recording the pixels in a memory is performed through a process of thinning out the number of output pixels, a synthesizing process including addition of a plurality of pixels, or the like, not recording the signal of pixels output from the imaging element on a memory without change.

However, a problem that jaggedness occurs in an output image is manifested by such a pixel number conversion process.

The occurrence of jaggedness based on reduction of the number of jagged pixels will be described with reference to drawings.

FIGS. 1A and 1B show drawings of:

(A) Pixel arrangement (Bayer arrangement) of an imaging element; and (B) Pixel centroids of output pixels.

The pixel arrangement shown in FIG. 1A is pixel arrangement of a large number of pixels of an imaging element, and a capture image has pixel information of the large number of pixels. An image to be stored in a memory is generated by cutting the number of pixels. For example, a pixel value of one pixel in an output image is set and output based on four pixels of the same color in the imaging element of FIG. 1A.

In other words, the total number of pixels is reduced by integrating and outputting the four pixels into one pixel.

FIG. 1B is a drawing showing the pixel centroid of each output pixel after the reduction in the number of pixels in the original imaging element.

For example, a Gb pixel 31 of FIG. 1B is a pixel value determined equally using the pixel values of Gb pixels in the four corners of a block 21 of 3×3 pixels in FIG. 1A. The pixel centroid is set in the center position of the block 21 of 3×3 pixels. A Gb pixel 31 of FIG. 1B shows the position of the centroid.

FIGS. 1A and 1B show an example in which a process or reducing the number of pixels in the output image to ¼ of the number of pixels of the imaging element by converting 64 pixels of 8×8 pixels shown in FIG. 1A into 16 pixels of 4×4 pixels shown in FIG. 1B.

For the above process, an addition and averaging process is executed for, for example, the pixels (of Gb) in the four corners of the block 21 of 3×3 pixels shown in FIG. 1A, and the pixel value of one Gb pixel in the output image is computed.

In other words, based on the four Gb pixels included in the block 21 of 3×3 pixels shown in FIG. 1A, the pixel value of the Gb pixel 31 shown in FIG. 1B is computed.

In this case, the centroid of the Gb pixel 31 in the output image is the position of (x, y)=(2, 2) in the coordinate axis with x set in the horizontally right direction and y set in the vertically lower direction, that is, the position of the Gb pixel 31 shown in FIG. 1B.

In addition, based on four B pixels included in a block 22 of 3×3 pixels shown in FIG. 1A, the pixel value of a B pixel 32 shown in FIG. 1B is computed.

In this case, the centroid of the B pixel 32 in the output image is the position of (x, y)=(3, 2), that is, the position of the B pixel 32 shown in FIG. 1B.

In the same manner, based on four Gb pixels included in a block 23 of 3×3 pixels shown in FIG. 1A, the pixel value of Gb pixel 33 shown in FIG. 1B is computed.

In this case, the centroid of the Gb pixel 33 in the output image is the position of (x, y)=(6, 2), that is, the position of the Gb pixel 33 shown in FIG. 1B.

In addition, based on four B pixels included in a block 24 of 3×3 pixels shown in FIG. 1A, the pixel value of B pixel 34 shown in FIG. 1B is computed.

In this case, the centroid of the B pixel 34 in the output image is the position of (x, y)=(7, 2), that is, the position of the B pixel 34 shown in FIG. 1B.

A total of 16 pixels shown in FIG. 1B is output as an image of 4×4 pixels to form an output image.

Figure 2B:
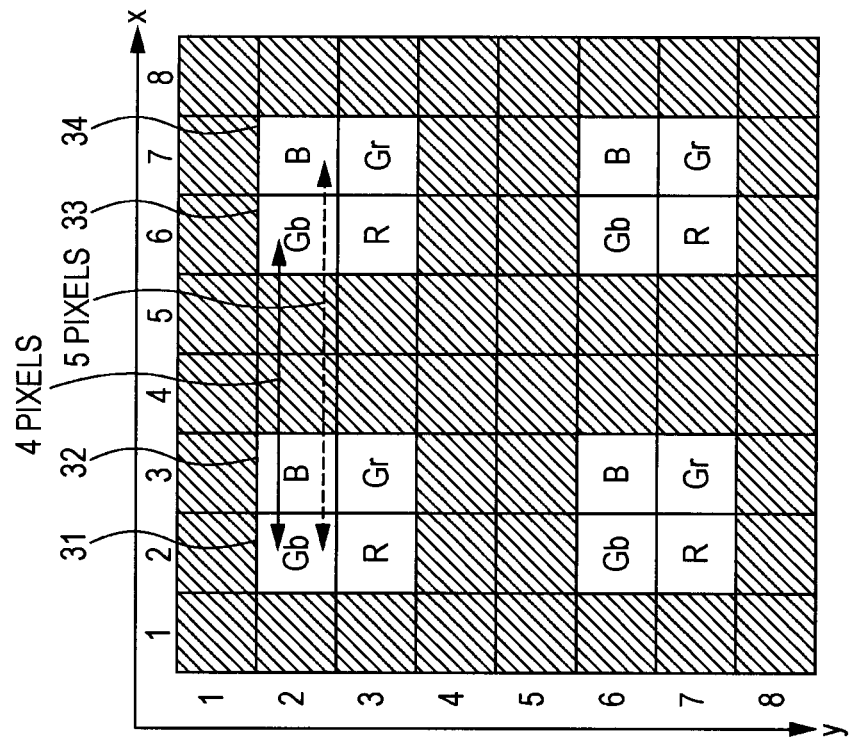

In other words, the pixels are output as an image 70 of 4×4 pixels as shown in FIG. 2B.

FIGS. 2A and 2B show:

(B) Pixel centroids of the output pixels (the same as in FIG. 1B); and (C) Pixel position of the output image.

In FIG. 2A, 2×2 pixels in the upper left side, that is a block of 2×2 pixels including the Gb pixel 31 and the B pixel 32 is considered in a fixed position. In the setting case, all three other blocks of 2×2 pixels are moved along the arrows (α), (β), and (γ) shown in FIG. 2B, and output as constituent pixels of the image 70 of 4×4 pixels shown in FIG. 2B.

With such a shift process, the following problem occurs.

For example, the Gb pixel 33 with the position of the pixel centroid of (x, y)=(6, 2) is set as a Gb pixel 53 with the pixel position of (x, y)=(3, 2) in the output image.

In addition, the B pixel 34 with the position of the pixel centroid of (x, y)=(7, 2) is set as a B pixel 54 with the pixel position of (x, y)=(4, 2) in the output image.

Herein, the reduced scale ratios thereof are computed.

It is assumed that the Gb pixel 31 with the pixel position of (x, y)=(2, 2) is a reference pixel in the fixed position.

The Gb pixel 33 with the pixel position of (x, y)=(6, 2) shown in FIG. 2A is four pixels apart from the Gb pixel 31 that is the reference pixel.

Since the Gb pixel 33 is set as the Gb pixel 53 with the pixel position of (x, y)=(3, 2) in the output image, the distance from the Gb pixel 31 as the reference pixel to the Gb pixel 53 is two pixels.

In other words, the reduced scale ratio thereof is two pixels/four pixels=1/2.

On the other hand, the B pixel 34 with the pixel position of (x, y)=(7, 2) shown in FIG. 2A is five pixels apart from the Gb pixel 31 that is the reference pixel.

Since the B pixel 34 is set as the B pixel 54 with the pixel position of (x, y)=(4, 2) in the output image, the distance from the Gb pixel 31 as the reference pixel to the B pixel 54 is three pixels.

In other words, the reduced scale ratio thereof is three pixels/five pixels=3/5.

As such, the reduced scale ratios between pixels varies, and an output image is generated having relative positions of pixels different from relative positions of each pixel in a captured image corresponding to the pixel arrangement of an imaging element.

In other words, an output image is generated in which intervals of pixels of the original image captured in the imaging element are irregularly reduced.

Such irregularity in pixel intervals causes deterioration of image quality.

Specifically, image deterioration resulting from, for example, expanded jaggedness as shown in FIG. 3 occurs.

The original image (A) of FIG. 3 is an image of high resolution with a large number of pixels corresponding to a captured image of an imaging element, and the image has small jaggedness.

Based on the original image (A) of FIG. 3, if a pixel number reduction process in which relative pixel positions varies as described with reference to FIGS. 1A to 2B is performed, an image with expanded jaggedness image (B) as shown in FIG. 3 is generated.

Furthermore, the jaggedness is a kind of fold-over noise. Deterioration by jaggedness is intensified due to irregularity of the intervals of the pixel centroids after addition.

Furthermore, in addition to this, various deterioration in image quality is caused such that a difference between colors of an output image and the original image is generated due to irregular positional relationship in color combination of RGB, or the like.

In the image processing device according to the present disclosure, a process of suppressing the occurrence of jaggedness derived from, for example, a reduction in the number of pixels as above is realized.

Furthermore, the cause of jaggedness varies, not limited to the above-described pixel number reduction process. The image processing device of the present disclosure performs a process of reducing jaggedness generated due to such various causes.

Specifically, the reduction of jaggedness is intended such that, for example, luminance components of an image are extracted, the shape of the image prior to the jaggedness occurrence is estimated based on the luminance components, similar image areas are detected from the image using the estimated shape information, and addition and averaging are performed for pixels in the detected similar areas.

The above process can be effective for an arbitrary pattern of occurring jaggedness, without depending on the conditions of, for example, a pixel addition process or a pixel thinning-out process that are the causes of jaggedness. In addition, the above process is effective for jaggedness occurring in edges at arbitrary angles due to the fact that the process is not involved in a specific direction.

[2. Regarding Configuration and Process of Image Processing Device]

A configuration and a process of the image processing device according to the present disclosure will be described with reference to FIG. 4 and the following drawings.

Figure 4:
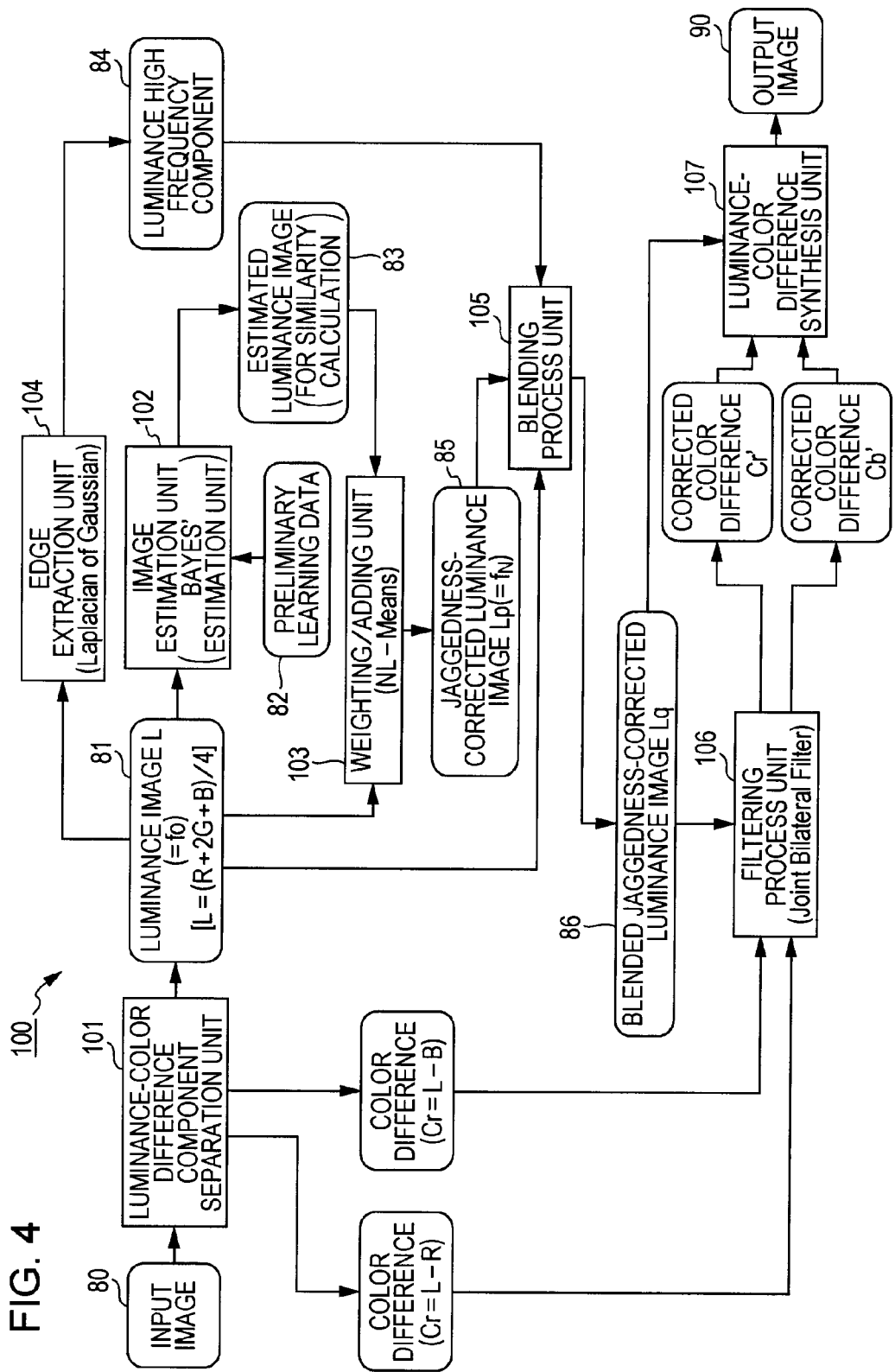
FIG. 4 is a diagram illustrating a configuration example of major parts of an image processing device.

FIG. 4 is a diagram illustrating a configuration example of major parts of an image processing device 100 according to the present disclosure.

The image processing device 100 is input with an input image 80, for example, an RGB image, or the like, and generates and outputs an output image 90 that is an image with reduced jaggedness.

As shown in FIG. 4, the image processing device 100 includes a luminance-color difference component separation unit 101, an image estimation unit (Bayes' estimation unit) 102, a weighting/adding unit 103, an edge extraction unit 104, a blending process unit 105, a filtering process unit 106, and a luminance-color difference synthesis unit 107.

The image processing device 100 executes a process of reducing jaggedness included in the input image 80, for example, jaggedness that has already occurred from the pixel addition process or thinning-out process described above.

Specifically, a reduction of jaggedness is sought such that the shape of the image prior to the jaggedness occurrence is estimated first based on the luminance components of the input image 80, similar areas in the image are searched for using the shape information, and weighed averaging is performed for pixels in the similar areas.

The above process is not involved in a pixel addition or thinning-out process, but can be effective for an arbitrary pattern of occurring jaggedness. In addition, the above process is effective for jaggedness occurring in edges at arbitrary angles due to the fact that the process is not involved in a specific direction.

Furthermore, FIG. 4 shows a configuration of the major parts of the image processing device 100, and the image processing device 100 includes, in addition to the parts, a control unit that executes overall processing control, for example, a control unit with a CPU having a function of executing a predetermined processing program, a memory for storing programs, images, and various parameters, and the like.

Specifically, the image processing device 100 can be realized as, for example, a PC, an imaging device (camera), or the like, such a device can have a configuration according thereto, in addition to the configuration shown in FIG. 4.

The process executed by the image processing device 100 is broadly classified into six processes as follows.

(Process 1) Color conversion from an RGB image to a luminance image and color difference information is performed. In addition, an inverted conversion thereof is performed [Process of the luminance-color difference component separation unit 101 and the luminance-color difference synthesis unit 107]

(Process 2) A luminance image prior to the jaggedness occurrence is estimated based on Bayes' estimation from a luminance image that already has jaggedness occurred [Process of the image estimation unit (Bayes' estimation unit) 102].

(Process 3) The degree of similarity is obtained from the estimated luminance image, and the reduction of jaggedness is performed with NL-Means [Process mainly of the weighting/adding unit 103]

(Process 4) The edge areas of the image with the reduced jaggedness by Process 3 and portions other than the edge areas of the original image are blended [Process of the edge extraction unit 104 and the blending process unit 105]

(Process 5) Corrected color difference information is generated based on a correlation process by JBF in which the jaggedness-reduced luminance image is referred to for a color difference image [Process of the filtering process unit 106].

(Process 6) Luminance-color difference synthesis process [Process of the luminance-color difference synthesis unit 107]

Hereinbelow, the six processes will be described in detail in order.

(2-1. (Process 1) Color Conversion Process from an RGB Image to a Luminance Image and Color Difference Information)

First, "a color conversion process from an RGB image to a luminance image and color difference information (process 1)" will be described.

The process is executed by the luminance-color difference component separation unit 101 of the image processing device 100 shown in FIG. 4.

In this technique, a jaggedness reduction process is performed only for luminance components. This is because the luminance components have the particularly intensive influence of jaggedness.

The luminance-color difference component separation unit 101 shown in FIG. 4 inputs the input image (for example, an RGB image) 10 including jaggedness and performs luminance-color difference conversion according to, for example, the following (Formula 1).

$$L = \frac{R+2G+B}{4}$$
$$Cr = L - R$$
$$Cb = L - B$$

(Formula 1)

Wherein:
L: luminance
Cr, Cb: color difference
R, G, B: respective R, G, and B components of the image Furthermore, the luminance-color difference conversion process shown in the above-described (Formula 1) is an example, other various existing processes may be applicable. It is possible to use an arbitrary color conversion method if the method is general methods of YCbCr, Lab, or the like that can separate components of luminance and color difference.

The luminance-color difference component separation unit 101 inputs RGB values of each constituent pixel in the input image 80, and computes:

Luminance: $L=(R+2G+B)/4$;

Color difference: $Cr=L-R$; and

Color difference: $Cb=L-B$ for each pixel unit in accordance with the above-described (Formula 1).

As shown in FIG. 4, the luminance $[L=(R+2G+B)/4]$ computed by the luminance-color difference component separation unit 101 is input to the image estimation unit (Bayes' estimation unit) 102.

In addition, the color differences $[Cr=L-R$ and $Cb=L-B]$ are input to the filtering process unit 106.

Furthermore, a restoration process from the luminance-color difference components to the RGB components executed as the final process in the luminance-color difference synthesis unit 107 can be sought by solving the above-described (Formula 1) for R, G, and B.

(2-2. (Process 2) Process of Estimating a Luminance Image Prior to the Jaggedness Occurrence Based on a Luminance Image with Jaggedness Already Occurred Using Bayes' Estimation)

Next, a luminance image estimation method by Bayes' estimation will be described.

The process is executed in the image estimation unit (Bayes' estimation unit) 102 shown in FIG. 4. The image estimation unit (Bayes' estimation unit) 102 is input with the luminance $[L=(R+2G+B)/4]$ computed by the luminance-color difference component separation unit 101, and estimates a luminance image prior to the jaggedness occurrence based on a luminance image constituted by the luminance information using Bayes' estimation.

Since jaggedness to be processed this time is jaggedness occurring by, for example, a pixel addition or thinning-out process, it is possible to know in advance the pattern of jaggedness in a prior simulation, in other words, with what shape and what degree of amplitude and intensity the jaggedness is distributed in the periphery of edges of what degree and contrast.

Using the condition, the image estimation unit (Bayes' estimation unit) 102 performs statistical estimation of the edge shape prior to the jaggedness occurrence by generating at mimic jaggedness for all patterns of edges in advance, statistically observing the extend of a change in the edges before and after the jaggedness occurrence to use the statistical amount.

In other words, preliminary learning data 82 shown in FIG. 4 is generated in advance, and the edge shape prior to the jaggedness occurrence of an image to be processed is estimated using the preliminary learning data.

In the technique, a method is employed in which pixel values of luminance images before and after the jaggedness occurrence are observed, and plausible pixel values from the distribution of the pixel values after the jaggedness occurrence are estimated. The specific procedure will be described.

First, a process of generating the preliminary learning data 82 will be described.

Figure 5B:
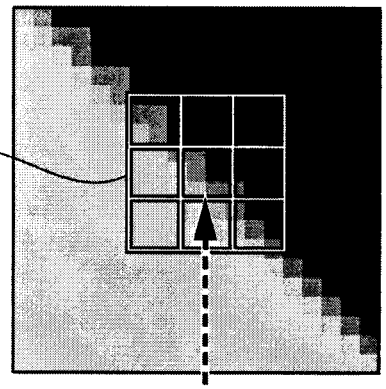
FIGS. 5A and 5B are diagrams illustrating an example of a generation process of preliminary learning data based on data for learning.
Figure 5A:
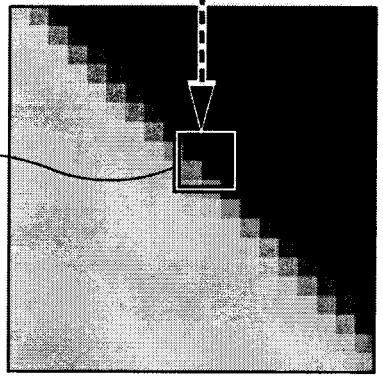

An image for learning including edges as shown in FIG. 5A is prepared.

FIG. 5A shows an image for learning prior to the jaggedness occurrence.

By causing jaggedness for the image of FIG. 5A, an image for learning after the jaggedness occurrence as shown in FIG. 5B is generated.

Furthermore, it is preferable that the jaggedness generation process be performed by executing the same process as the pixel addition or thinning-out process for an image that is subject to an actual process.

Next, (A) a pixel value x of a noted position (i, j) in the image prior to the jaggedness occurrence and (B) pixel values y1, y2, ..., yn of the n peripheral pixels in the position (i, j) in the image after the jaggedness occurrence are respectively observed.

FIGS. 5A and 5B show an example in which n is set to 9.

If the same process is repeated for the pixels included in the image for learning, it is possible to observe a histogram of n pixels in the image after the jaggedness occurrence in the periphery of a pixel value x. Since the histogram is just the frequency of appearance of a pixel value, the observed histogram is deemed as probability distribution. Accordingly, the following probabilities are obtained from the prior observation.

P(x): the probability that the pixel value x appears in the image prior to the jaggedness occurrence (=the histogram of the image prior to the jaggedness occurrence).

P(y1, y2, ..., yn|x): the probability that, when the pixel value x appears in the image prior to the jaggedness occurrence, the pixel values of the n peripheral pixels in the corresponding pixel positions of the image after the jaggedness occurrence becomes y1, y2, ..., yn in order.

The above probabilities are obtained.

The above-described P(y1, y2, ..., yn|x) corresponds to the occurrence probability of the jaggedness pattern appearing in an edge area. Based on the computed probability, it is possible to further obtain a probability shown in (Formula 2) below based on the Bayes' theorem.

$$P(x \mid y_1, y_2, \ldots, y_n) = \frac{P(y_1, y_2, \ldots, y_n \mid x) \cdot P(x)}{P(y_1, y_2, \ldots, y_n)}$$

(Formula 2)

Wherein,

P(x): the probability that the pixel value x appears in the image prior to the jaggedness occurrence (=the histogram of the image prior to the jaggedness occurrence), P(y1, y2, ..., yn): the probability that n pixel blocks of the pixel values y1, y2, ..., yn appear in the image after the jaggedness occurrence, P(y1, y2, ..., yn|x): the probability that, when the pixel value x appears in the image prior to the jaggedness occurrence, the pixel values of the n peripheral pixels in the corresponding pixel positions of the image after the jaggedness occurrence becomes y1, y2, yn in order, and P(x|y1, y2, ..., yn): the probability that, when the pixel values of n pixel blocks in the image after the jaggedness occurrence becomes y1, y2, ..., yn in order, a pixel value in a pixel position of the image prior to the jaggedness occurrence corresponding to the pixel position in the center of the blocks becomes x.

After all, when the pixel values of y1, y2, ..., yn are observed in the n pixel blocks selected from the image after the jaggedness occurrence in accordance with the above-described (Formula 2), it is possible to compute the probability that the pixel value x occurs in a pixel of the image prior to the jaggedness occurrence corresponding to the pixel in the center of the pixel blocks.

Therefore, if x, which makes the probability P(x|y1, y2, ..., yn) obtained when the pixel values of the pixel blocks in the image after the jaggedness occurrence are observed to the maximum, is obtained, it is possible to estimate a pixel value before jaggedness.

Specifically, it is possible to estimate a pixel value x* prior to the jaggedness occurrence in accordance with (Formula 3) shown below. Furthermore, the pixel value herein is a pixel value of a luminance image and corresponds to a luminance value.

$$x^* = \underset{x}{\mathrm{argmax}}\{P(x \mid y_1, y_2, \ldots, y_n)\} = \underset{x}{\mathrm{argmax}}\left\{\frac{P(y_1, y_2, \ldots, y_n \mid x) \cdot P(x)}{P(y_1, y_2, \ldots, y_n)}\right\}$$ (Formula 3)

Wherein, x*: an estimated pixel value (luminance value) prior to the jaggedness occurrence Herein, the probability of observing the peripheral pixel values y1, y2, ..., yn after the jaggedness occurrence is determined only for one observation area, the above (Formula 3) can be simplified as shown in Formula 4.

$$\begin{aligned}x^* &= \underset{x}{\mathrm{argmax}}\{P(x \mid y_1, y_2, \ldots, y_n)\} \\ &= \underset{x}{\mathrm{argmax}}\left\{\frac{P(y_1, y_2, \ldots, y_n \mid x) \cdot P(x)}{P(y_1, y_2, \ldots, y_n)}\right\} \\ &= \underset{x}{\mathrm{argmax}}\{P(y_1, y_2, \ldots, y_n \mid x) \cdot P(x)\} \\ &= \underset{x}{\mathrm{argmax}}\{\log P(y_1, y_2, \ldots, y_n \mid x) + \log P(x)\}\end{aligned}$$ (Formula 4)

The image estimation unit (Bayes' estimation unit) 102 selects pixel blocks from a luminance image generated based on the input image (jaggedness-occurring image) 10 input from the luminance-color difference component separation unit 101, and estimates x* that is a pixel value (luminance value) prior to the jaggedness occurrence by applying the above-described (Formula 4) thereto.

With the estimation process, an estimated image prior to the jaggedness occurrence, that is, a luminance image prior to the jaggedness occurrence is generated.

Furthermore, the estimated luminance image herein has a small number of gray scales and strongly tends to have an artificial look. This is because pixels values that are stochastically plausible incline to some of the whole gray scales. Thus, in an example of this technique, luminance information obtained based on Bayes' estimation is set to be used only as edge shape information.

In the Bayes' estimation process in the image estimation unit (Bayes' estimation unit) 102 described above, a process of estimating pixel values prior to the jaggedness occurrence from pixel value of the image after the jaggedness occurrence is performed using pixels values of noted pixels and the peripheral pixels.

In a process other than the above process, it is also possible to perform the process of estimating pixel values prior to the jaggedness occurrence from pixel value of the image after the jaggedness occurrence based on Bayes' estimation using, for example, feature amounts that express edges.

In this case, as preliminary learning data, the feature amounts that express the edges are extracted from the images before and after the jaggedness occurrence in advance and the statistical amounts are retained.

When the image after the jaggedness occurrence, which is the target of the jaggedness reduction process, is input, the feature amounts that express the edges are extracted from the image after the jaggedness occurrence, and the feature amounts of the edges prior to the jaggedness occurrence are obtained using Bayes' estimation. Since it is possible to obtain the degree of similarity between the edges prior to the jaggedness occurrence if the feature amounts are used, it is possible to use the degree as the degree of similarity that is necessary for an averaging process to be continued.

In the image estimation unit (Bayes' estimation unit) 102, a stochastic approach is employed in order to obtain an accurate edge shape prior to the jaggedness occurrence, but it may be configured to generate a smoothed image that has been subjected to, for example, smoothing filtering for the image after the jaggedness occurrence and to consider the smoothed image as the image prior to the jaggedness occurrence.

If smoothing filtering is performed to the entire image to the extent that overall jaggedness is reduced after the jaggedness is caught, the overall resolution of the image deteriorates, but the structure of edges having intensive contrast particularly remarkably expressing jaggedness itself if maintained. Calculation of the degree of similarity in the periphery of edges using the structure is a substituent technique of the method using Bayes' estimation.

Specifically, smoothing is performed in application of a linear filter as shown in, for example, the next (Formula 5) for the image after the jaggedness occurrence.

$$\begin{bmatrix} 1 & 2 & 1 \\ 2 & 4 & 2 \\ 1 & 2 & 1 \end{bmatrix}$$ (Formula 5)

The cut-off frequency of the filter shown in the above-described (Formula 5) is also a fold-over-occurring frequency that is the cause of jaggedness. It is difficult to completely remove fold-over itself for smoothing for an image that already has fold-over itself, but since a jaggedness reduction effect can be obtained to some degree, such a filter is used.

(2-3. (Process 3) Process of Reducing Jaggedness with NL-Means by Obtaining the Degree of Similarity from an Estimated Luminance Image)

Next, a process of reducing jaggedness with NL-Means (Non-Local-Means: Non-local technique) by obtaining the degree of similarity from an estimated luminance image prior to the jaggedness occurrence estimated in the image estimation unit (Bayes' estimation unit) 102 will be described.

The process is executed mainly in the weighting/adding unit (NL-Means) 103 in the image processing device 100 shown in FIG. 4.

In most cases, jaggedness that is to be reduced by the image processing device 100 appears forming a regular pattern along the edge. For this reason, it is possible to cancel the jaggedness by averaging similar pixels in the periphery of the edge. However, it is very difficult to average pixels along the edge in an edge shape with jaggedness left. Therefore, averaging is performed for similar pixels in the periphery of the edge, ignoring the influence of jaggedness, by using the edge shape estimation result described in (Process 2) above. In the technique, the NL-Means method is used in the averaging process. The averaging process by the NL-Means method is executed as a process according to (Formula 6) below.

$$g(x) = \frac{1}{C(x)} \sum_{y \in I} w(x, y) f(y)$$

$$w(x, y) = \exp\left(-\frac{\|f(x) - f(y)\|_2^2}{h^2}\right)$$

$$C(x) = \sum_{y \in I} w(x, y)$$

(Formula 6)

Furthermore, each of the parameters is as follows.

x: x coordinate of the target pixel value
y: y coordinate of the reference pixel value
I: a set of pixels of the entire image
g(x): a pixel value after NL-Means is applied
f(x): a pixel value before NL-Means is applied
f(y): a parameter that expresses a pixel value in the periphery of the x coordinate with a vector
w(x, y): a weight obtained from a pixel value in x and y coordinates
h: an intensity adjustment parameter of NL-Means
C(x): sum of weights The technique of NL-Means shown in the above-described (Formula 6) is to multiply the target pixel and the central pixel value of an area similar to the peripheral area of the target pixel by a weight determined according to the degree of similarity and to add them.

The weighting/adding unit (NL-Means) 103 is input with an estimated luminance image 83 generated in the image estimation unit (Bayes' estimation unit) 102, and the degree of similarity is determined based on the estimated luminance image 83, and the degree of similarity is used in the computation of weight of a weighted averaging. In the process, it is possible to perform weighted averaging by giving a large weight to a similar edge area in the image prior to the jaggedness occurrence generated as the estimated luminance image 83.

Accordingly, it is possible to reduce the influence of jaggedness appearing as a regular pattern. With reference to FIGS. 6A to 6D, a specific process example executed by the weighting/adding unit (NL-Means) 103 will be described.

FIG. 6A is an estimated luminance image prior to the jaggedness occurrence generated by the image estimation unit (Bayes' estimation unit) 102.

The weighting/adding unit (NL-Means) 103, for example, selects a processing target area 201 as a jaggedness reduction target area from the estimated luminance image, and detects a similar area to the processing target area 201 from the image.

It is assumed that, for example, three similar areas 211 to 213 are detected as shown in FIG. 6B.

Next, the weighting/adding unit (NL-Means) 103 determines the degree of similarity of the processing target area to the three similar areas 211 to 213. For example, the degree of similarity according to the pattern changes of pixel values is set to each of the similar areas 211 to 213.

Furthermore, a weight is set according to the degree of similarity set in each of the similar areas 211 to 213.

A large weight is set for a similar area having a high degree of similarity to the processing target area 201 and a small weight is set for a similar area having a low degree of similarity.

Next, the weighting/adding unit (NL-Means) 103 is input with a luminance image 81 before the reduction of jaggedness that is output from the luminance-color difference component separation unit 101 shown in FIG. 4, and performs a weighting and adding process for the luminance image.

The luminance image 81 before the reduction of jaggedness that is output from the luminance-color difference component separation unit 101 shown in FIG. 4 is the image shown in FIG. 6C.

The weighting/adding unit (NL-Means) 103 selects areas in the positions corresponding to the similar areas 211 to 213 that are shown in FIG. 6B and detected to be similar to the processing target area 201 set based on the estimated luminance image prior to the jaggedness occurrence generated by the image estimation unit (Bayes' estimation unit) 102 from the luminance image 81 before the reduction of jaggedness shown in FIG. 6C, performs weighted averaging for the pixels in the corresponding positions of the similar areas using computed weights, and computes corrected pixel values (corrected luminance values) of pixel values (luminance values) of the processing target area.

Through the process, it is possible to generate a luminance image with reduced jaggedness.

The resultant image is the jaggedness-reduced luminance image shown in FIG. 6D.

In the above-described process example, the configuration has been described, in which the weighting/adding unit (NL-Means) 103 reduces jaggedness by the NL-Means (Non-local technique), but it is also possible to use Joint Bilateral Filter instead of NL-Means. ML-Means is used to compute the degree of similarity between areas in a block unit, but it is possible to use the degree of similarity in a pixel unit, not in a block unit. When the Joint Bilateral Filter is applied, a process based on computation of a degree of similarity in a pixel unit is also possible.

(2-4. (Process 4) Process of Blending the Edge Area of a Jaggedness-Reduced Image by Process 3 and Portions Other than the Edge Area of the Original Image)

Next, a process of blending the edge area of a jaggedness-reduced image by Process 3 and portions other than the edge area of the original image will be described.

The process is effective as a process of the edge extraction unit 104 and the blending process unit 105 of the image processing device 100 shown in FIG. 4.

The degree of similarity is obtained from the estimated luminance image for which estimation is performed by the weighting/adding unit 103 as shown in (Process 3) described above, and then it is possible to reduce jaggedness in the periphery of the edge through the jaggedness reduction process by NL-Means.

However, if NL-Means is applied to all areas in the image, the resolution of the image conspicuously deteriorates in a texture area, or the like. This is because the texture itself is treated as noise and a signal level is lowered by NL-Means in an area including a large amount of signal with strong randomness as in a texture, which is a fundamental problem of NL-Means.

Therefore, a blending process (masking process) is performed in which the result of NL-Means is actively used for the periphery of the edge where jaggedness mostly occurs in a processing target image, and the original image is actively used in other areas.

In other words, a process of blending each output is performed according to image characteristic that the NL-Means application result is desired to be used only for the periphery of the edge, and the original image is used for texture components that a general edge detection filter responds.

The blending process is executed by the blending process unit 105 of the image processing device 100 shown in FIG. 4.

The edge detection process is executed by the edge extraction unit (Laplacian of Gaussian) 104.

First, the process of the edge extraction unit 104 will be described

The edge extraction unit 104 of the image processing device 100 shown in FIG. 4 extracts edges areas with a Laplacian of Gaussian (LoG) filter.

The LoG filter is a filter that performs edge detection by Laplacian for an image smoothed by Gaussian, and expressed by the following (Formula 7).

$$f_{LoG}(i, j) = \frac{i^2 + j^2 - 2\sigma^2}{\sigma^4} e^{-\left(\frac{i^2+j^2}{2\sigma^2}\right)}$$ (Formula 7)

Wherein i, j: the distance from the center of the filter in the horizontal and vertical directions; and σ: the variance value of Gaussian.

Since a texture area undergoes a Laplacian filter in a state where high frequency components are removed by the first Gaussian filter based on the above-described (Formula 7), it is possible to suppress the sensitivity of detection in comparison to a case of implementing the Laplacian filter without such removal. On the other hand, since the high frequency components are still retained on the edge with intensive contrast where jaggedness is particularly conspicuous even smoothing by Gaussian is performed, it is possible to maintain the sensitivity of response by Laplacian at a high level.

The edge extraction unit 104 outputs a detection value (LoG filter detection value) obtained by the filter shown in the above-described (Formula 7) to the blending process unit 105 as luminance high frequency component information 84 shown in FIG. 4.

The blending process unit 105 computes, for the luminance high frequency component information 84 input from the edge extraction unit 104, a blending rate according to the luminance high frequency component information in each pixel unit based on a weight (blending rate) distribution function that linearly changes threshold values using the upper-limit threshold value ($th_{upper}$) and the lower-limit threshold value ($th_{lower}$) that are determined in advance.

The blending process unit 105 executes a blending process of a luminance image L 81 before the correction of jaggedness output from the luminance-color difference component separation unit 101 shown in FIG. 4 and a jaggedness-corrected luminance image Lp 85 that is the application result of NL-Means output from the weighting/adding unit (NL-Means) 103, and generates a blended jaggedness-corrected luminance image Lq 86.

The blending rate described above corresponds to the blending rate of the jaggedness-corrected luminance image Lp 85 output from the weighting/adding unit (NL-Means) 103 for each pixel of blended jaggedness-corrected luminance image Lq 86 generated by the blending process unit 105.

Figure 7:
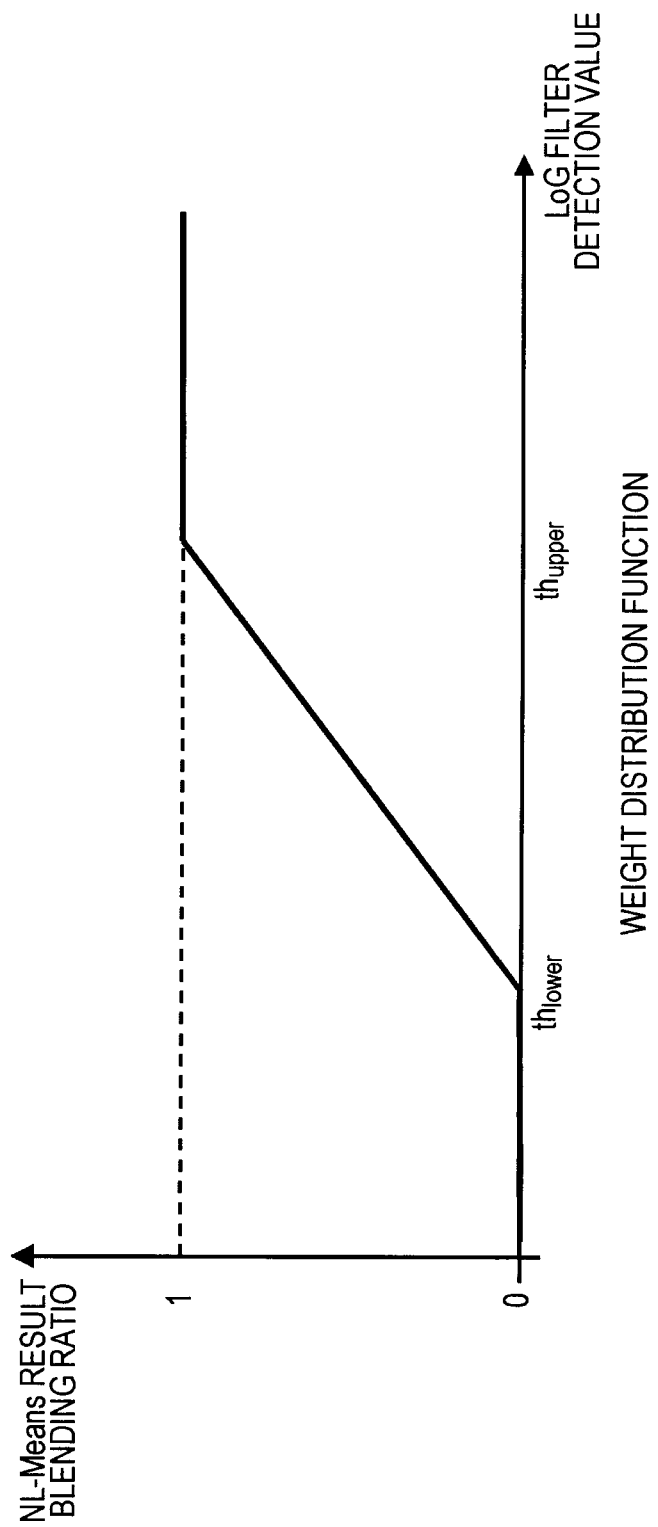
FIG. 7 is a diagram illustrating an example of a graph showing the correspondence relationship between a LoG filter detection value and a blending ratio.

The following (Formula 8) shows a blending rate distribution function α(l), and FIG. 7 shows an example thereof.

$$\alpha(l) = \begin{cases} 0 & l < th_{lower} \\ \frac{1}{th_{upper} - th_{lower}}l - \frac{th_{lower}}{th_{upper} - th_{lower}} & th_{lower} \leq l < th_{upper} \\ 1 & l > th_{upper} \end{cases}$$ (Formula 8)

Furthermore, in the above-described (Formula 8), each parameter is as follows.

l: a LoG filter detection value

α(l): an NL-Means result blending rate when the LoG filter detection value is l $th_{upper}$, $th_{lower}$: respective upper and lower limit threshold values.

The blending process unit 105 shown in FIG. 4 executes a blending process of the luminance image L 81 (=fo) before the correction of jaggedness output from the luminance-color difference component separation unit 101 shown in FIG. 4 and the jaggedness-corrected luminance image Lp 85 (=$f_N$) that is the application result of NL-Means output from the weighting/adding unit (NL-Means) 103, by applying the blending rate obtained based on the above-described blending rate distribution function, and generates the blended jaggedness-corrected luminance image Lq 86.

The blending process by the blending process unit 105 is executed in accordance with the following (Formula 9).

$$f(x) = \alpha(x)f_N(x) + (1 - \alpha(x))f_o(x)$$ (Formula 9)

Wherein f(x): a luminance image after blending (=the blended jaggedness-corrected luminance image Lq 86 shown in FIG. 4), α(x): a blending rate at x coordinate, $f_N(x)$: the pixel value (luminance value) of the jaggedness-corrected luminance image Lp 85, and fo(x): the pixel value (luminance value) of the luminance image L 81 before the correction of jaggedness.

As above, a luminance image constituted by luminance components of the jaggedness-corrected image that is the final output is generated.

In other words, the image is the blended jaggedness-corrected luminance image Lq 86 shown in FIG. 4.

The blending process unit 105 outputs the generated jaggedness-corrected luminance image Lq 86 to the filtering process unit 106 and the luminance-color difference synthesis unit 107.

(2-5. (Process 5) Generation of Corrected Color Difference Information Based on a Correlation Process by JBF in which a Jaggedness-Reduced Luminance Image is Referred to for a Color Difference Image)

Next, a process of generating corrected color difference information based on a correlation process by JBF in which a jaggedness-reduced luminance image is referred to for a color difference image will be described.

The process is executed by the filtering process unit 106 of the image processing device 100 shown in FIG. 4.

The filtering process unit 106 is input with the blended jaggedness-corrected luminance image Lq 86 generated by the blending process unit 105, and generates corrected color difference information (Cr', Cb') by the correlation process in application of the Joint Bilateral Filter (JBF) that uses the input blended jaggedness-corrected luminance image Lq 86 as a reference image.

The JBF is expressed by the following (Formula 10).

$$g(x) = \frac{1}{C(x)} \sum_{y \in N} w(x, y) f(y)$$

$$w(x, y) = \exp\left(-\frac{\|r(x) - r(y)\|_2^2}{h^2}\right)$$

$$C(x) = \sum_{y \in N} w(x, y)$$

(Formula 10)

Wherein, each parameter in the above-described (Formula 10) is as follows.

x: the coordinate of a target pixel value,
y: the coordinate of a reference pixel value,
N: the set of peripheral pixels of a target pixel x,
g(x): the pixel value after the application of the JBF,
f(x): the pixel value before the application of the JBF,
r(x): the reference image for calculating the degree of similarity with the JBF,
w(x, y): the weight obtained from the pixel value at the coordinates x, and y,
h: an intensity adjustment parameter of the JBF, and
C(x): the sum of weights.

Furthermore, a process of applying the JBF to color difference components having luminance components as the reference image is just a process of having the correlation of luminance and a color difference. The luminance components are in the state in which jaggedness in the periphery of the edge has already been reduced with the above-described various processes. The color difference components are corrected by taking the correlation between the luminance in that state. As a result, the color difference components of each pixel are corrected according to the corrected luminance pixels.

The corrected color difference (Cr', Cb') generated by the filtering process unit 106 is output to the luminance-color difference synthesis unit 107.

(2-6. (Process 6) Luminance-Color Difference Synthesis Process)

Next, a luminance-color difference synthesis process executed by the luminance-color difference synthesis unit 107 of the image processing device 100 shown in FIG. 4 will be described.

The luminance-color difference synthesis unit 107 is input with the blended jaggedness-corrected luminance image Lq 86 output from the blending process unit 105 and the corrected color difference (Cr', Cb') output from the filtering process unit 106.

The luminance-color difference synthesis unit 107 executes an inverted conversion process to RGB conversion from the luminance-color difference components, and generates a jaggedness-reduced image as an output image 90.

Furthermore, the inverted conversion process to RGB conversion from the luminance-color difference components can be effective as a process of obtaining R, G, and B by inputting:

the luminance value of the blended jaggedness-corrected luminance image Lq 86 output from the blending process unit 105; and the corrected color difference (Cr', Cb') output from the filtering process unit 106 in (Formula 1) previously described in "(Process 1) Color conversion process from an RGB image to a luminance image and color difference information.

The luminance-color difference synthesis unit 107 generates the output image 90 as a jaggedness-reduced image through the inverted conversion process.

Furthermore, in the above-described embodiment, there are mainly two reasons as follows that the jaggedness reduction described above is not performed for the color difference components.

For the first reason, deterioration of luminance components makes human beings strongly recognize deterioration of resolution in a natural image, and deterioration of high frequency components of the color difference components does not have as great influence as that of the luminance components has. For this reason, the jaggedness reduction process is performed for the luminance components in order to suppress the deterioration of resolution as much as possible no matter how long it takes a calculation time, and the JBF that has a relatively small amount of calculation is used even though a little deterioration of resolution occurs in the color difference components.

For the second reason, not only jaggedness of the luminance components but also a false color is observed in an artifact generated through pixel addition or thinning-out. This is because fold-over occurs in the high frequency components of R, G, and B components in respective phases.

What is effective in the reduction of false colors is to correct all the color difference components so as to have the correlation with the luminance components. Since the JBF in which the luminance components are set as a reference image has an effect of giving strong correlation, the application of the JBF to the color difference can be a measure taken not only for jaggedness of luminance but also the false colors.

Hereinabove, an embodiment implemented by the image processing device of the present disclosure has been described.

After all, the jaggedness reduction process executed by the image processing device of the present disclosure has, for example, characteristics as follows:

being possible to cope with an arbitrary jaggedness pattern;
having a little deterioration of resolution;
being possible to perform jaggedness reduction even on an edge forming an angle that is not expressible with a linear filter; and
reducing false colors.

[3. Regarding Configuration Example of Image Processing Device]

Previously, the configuration of the image processing device 100 has been described with reference to FIG. 4, but as described above, FIG. 4 shows a configuration of the main parts of the image processing device 100, and the image processing device 100 includes, in addition to the parts, a control unit that executes overall processing control, for example, a control unit with a CPU having a function of executing a predetermined processing program, and a memory for storing programs, images, and various parameters.

The image processing device 100 can be configured, particularly for example, as a PC, or an imaging device (camera).

Figure 8:
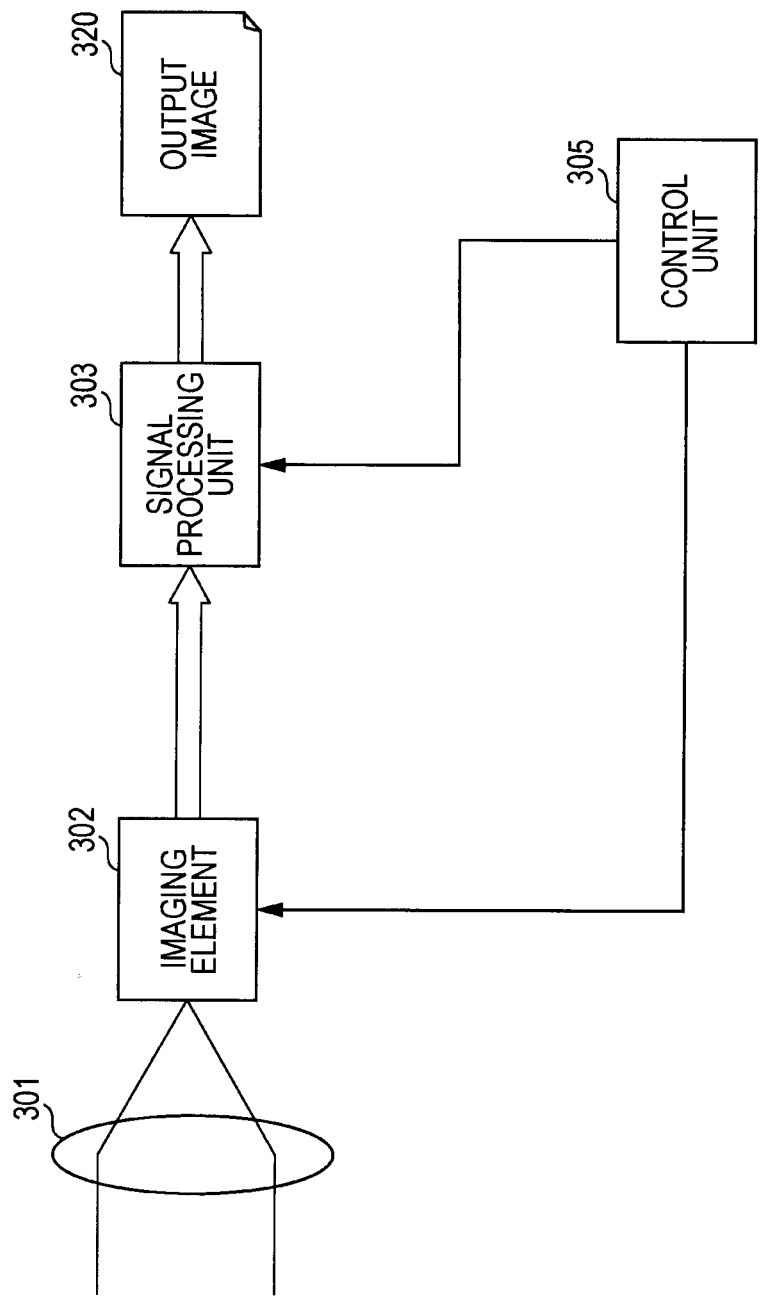
FIG. 8 is a diagram illustrating a configuration example of an imaging device that is an example of the image processing device.

FIG. 8 shows a configuration example of a case where the configuration of the image processing device shown in FIG. 4 is incorporated into an imaging device.

FIG. 8 is a block diagram showing a configuration example of an imaging device. Light entering through an optical lens 301 is incident to an imaging element 302 that includes, for example, a CMOS image sensor, or the like, and image data is output by photoelectric conversion. The output image data is input to a signal processing unit 303. The signal processing unit 303 performs general signal processes, for example, white balance adjustment, gamma correction, demosaicing, or the like.

Furthermore, the signal processing unit 303 generates an output image 320 by executing a pixel number reduction process, for example, a pixel addition process, a pixel thinning-out process, or the like, and the above-described jaggedness reduction process. The output image 320 is stored in, for example, a storage unit that is not shown in the drawings. Alternatively, the image is output to a display unit.

A control unit 305 outputs control signals to each unit in accordance with, for example, a program stored in a memory not shown in the drawings, and controls various processes.

Specifically, the control unit controls the jaggedness reduction process described with reference to, for example, FIGS. 4 to 7, that is, the following processes:

(Process 1) Color conversion process from an RGB image to a luminance image and color difference information) [Process of the luminance-color difference component separation unit 101 and the luminance-color difference synthesis unit 107];

(Process 2) Process of estimating a luminance image prior to the jaggedness occurrence based on a luminance image with jaggedness already occurred using Bayes' Estimation) [Process of the image estimation unit (Bayes' estimation unit) 102];

(Process 3) Process of reducing jaggedness with NL-Means by obtaining a degree of similarity from an estimated luminance image [Process mainly of the weighting/adding unit 103];

(Process 4) Process of blending the edge area of a jaggedness-reduced image by Process 3 and portions other than the edge area of the original image [Process of the edge extraction unit 104 and the blending process unit 105];

(Process 5) Generation of corrected color difference information based on a correlation process by JBF in which a jaggedness-reduced luminance image is referred to for a color difference image [Process of the filtering process unit 106]; and (Process 6) Luminance-color difference synthesis process [Process of the luminance-color difference synthesis unit 107].

[4. Summary of Configuration of Present Disclosure]

Hereinabove, the embodiments of the present disclosure has been described in detail with reference to specific embodiments. However, it is obvious that a person skilled in the art can attain modification or substitution of the embodiments within a scope not departing from the gist of the present disclosure. In other words, the present disclosure is disclosed in the form of exemplification, and is not supposed to be limitedly interpreted. In order to determine the gist of the present disclosure, the claims have to be considered.

Furthermore, the technique disclosed in the present specification can be configured as follows.

(1) An image processing device including:

an image estimation unit that estimates an image prior to the jaggedness occurrence from a jaggedness-occurring image and generates an estimated image prior to the jaggedness occurrence; and a weighting/adding unit that selects a jaggedness-occurring area as a processing target area in the estimated image prior to the jaggedness occurrence, detects a similar area that is a pixel area and similar to the processing target area, computes a weight according to the degree of similarity of each detected similar area to the processing target area, detects a corresponding area in the jaggedness-occurring image to the processing target area and the similar area, and computes a corrected pixel value of the processing target area of the jaggedness-occurring image through a weighting/adding process to which the weight of a pixel value of the detected corresponding area is applied.

(2) The image processing device described in (1) above, in which the image estimation unit inputs a luminance image generated from the jaggedness-occurring image and generates an estimated luminance image prior to the jaggedness occurrence, and the weighting/adding unit computes the weight based on the estimated luminance prior to the jaggedness occurrence, and executes a weighting/adding process of pixel values to which the weight for the luminance image generated from the jaggedness-occurring image is applied.

(3) The image processing device described in (1) or (2) above, in which the image estimation unit generates an estimated image prior to the jaggedness occurrence through a Bayes' estimation process to which preliminary learning data is applied.

(4) The image processing device described in any one of (1) to (3) above, in which the image estimation unit generates an estimated image prior to the jaggedness occurrence through a smoothing process for the jaggedness-occurring image.

(5) The image processing device described in any one of (1) to (4) above, in which the image estimation unit generates an estimated image prior to the jaggedness occurrence through a Bayes' estimation process to which statistical data of feature amounts expressing an edge is applied as preliminary learning data.

(6) The image processing device described in any one of (1) to (5) above, in which the weighting/adding unit executes a weighting/adding process to which an NL-Means (Non-Local-Means) method is applied.

(7) The image processing device described in any one of (1) to (5) above, in which the weighting/adding unit executes a weighting/adding process to which a Joint Bilateral Filter method is applied.

(8) The image processing device described in any one of (1) to (7) above, further including a filtering process unit that generates corrected color difference information by executing a correlation process in application of the Joint Bilateral Filter (JBF), setting a jaggedness-reduced luminance image having a corrected pixel value computed by the weighting/adding unit to a reference image.

(9) The image processing device described in any one of (1) to (8) above, further including a blending process unit that blends the jaggedness-reduced luminance image having a corrected pixel value computed by the weighting/adding unit and a jaggedness-occurring luminance image generated based on a jaggedness-occurring image prior to correction in accordance with a weight corresponding to an edge of an image.

In addition, a series of processes described in the present specification can be executed by hardware, software, or a combined composition of both. When the processes are executed by software, the execution is possible by installing a program in which a processing sequence is recorded in a memory in a computer incorporated with dedicated hardware, or by installing a program in a general-purpose computer executable various processes. Such a program can be recorded in advance in, for example, a recording medium. In addition to installing a program from a recording medium to a computer, it is possible to receive such a program through a network such as a LAN (Local Area Network), or the Internet, and install the program in a recording medium such as an internal hard disk, or the like.

Furthermore, various processes described in the present specification may be executed not only in a time-series manner following the description, but also in parallel or individually according to processing performance or necessity of a device that executes the processes. In addition, a system described in the present specification is a logically assembled composition of a plurality of devices, and is not limited to a system of which devices with each composition are contained in the same housing.

The present disclosure contains subject matter related to that disclosed in Japanese Priority Patent Application JP 2011-071541 filed in the Japan Patent Office on Mar. 29, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
   an image estimation unit that estimates an image prior to the jaggedness occurrence from a jaggedness-occurring image and generates an estimated image prior to the jaggedness occurrence; and
   a weighting/adding unit that selects a jaggedness-occurring area as a processing target area in the estimated image prior to the jaggedness occurrence, detects a similar area that is a pixel area and similar to the processing target area, and then computes a weight according to the degree of similarity of each detected similar area to the processing target area, and detects a corresponding area in the jaggedness-occurring image to the processing target area and the similar area, and then computes a corrected pixel value of the processing target area of the jaggedness-occurring image through a weighting/adding process to which the weight of a pixel value of the detected corresponding area is applied.

2. The image processing device according to claim 1, wherein the image estimation unit inputs a luminance image generated from the jaggedness-occurring image and generates an estimated luminance image prior to the jaggedness occurrence, and
   wherein the weighting/adding unit computes the weight based on the estimated luminance prior to the jaggedness occurrence, and executes a weighting/adding process of pixel values to which the weight for the luminance image generated from the jaggedness-occurring image is applied.

3. The image processing device according to claim 1, wherein the image estimation unit generates an estimated image prior to the jaggedness occurrence through a Bayes' estimation process to which preliminary learning data is applied.

4. The image processing device according to claim 1, wherein the image estimation unit generates an estimated image prior to the jaggedness occurrence through a smoothing process for the jaggedness-occurring image.

5. The image processing device according to claim 1, wherein the image estimation unit generates an estimated image prior to the jaggedness occurrence through a Bayes' estimation process to which statistical data of feature amounts expressing an edge is applied as preliminary learning data.

6. The image processing device according to claim 1, wherein the weighting/adding unit executes a weighting/adding process to which an NL-Means (Non-Local-Means) method is applied.

7. The image processing device according to claim 1, wherein the weighting/adding unit executes a weighting/adding process to which a Joint Bilateral Filter method is applied.

8. The image processing device according to claim 1, further comprising:
   a filtering process unit that generates corrected color difference information by executing a correlation process in application of the Joint Bilateral Filter (JBF), setting a jaggedness-reduced luminance image having a corrected pixel value computed by the weighting/adding unit to a reference image.

9. The image processing device according to claim 1, further comprising:
   a blending process unit that blends the jaggedness-reduced luminance image having a corrected pixel value computed by the weighting/adding unit and a jaggedness-occurring luminance image generated based on a jaggedness-occurring image prior to correction in accordance with a weight corresponding to an edge of an image.

10. An image processing method for executing image processing in an image processing device, comprising:
    estimating an image prior to the jaggedness occurrence from a jaggedness-occurring image and generating an estimated image prior to the jaggedness occurrence by an image estimation unit; and
    selecting a jaggedness-occurring area as a processing target area in the estimated image prior to the jaggedness occurrence, detecting a similar area that is a pixel area and similar to the processing target area, and then computing a weight according to the degree of similarity of each detected similar area to the processing target area, and detecting a corresponding area in the jaggedness-occurring image to the processing target area and the similar area, and then computing a corrected pixel value of the processing target area of the jaggedness-occurring image through a weighting/adding process to which the weight of a pixel value of the detected corresponding area is applied, by a weighting/adding unit.

11. A non-transitory computer-readable medium having embodied thereon a program, which when executed by a computer causes the computer to perform an image processing method, the method comprising:
    estimating an image prior to the jaggedness occurrence from a jaggedness-occurring image and generating an estimated image prior to the jaggedness occurrence in an image estimation unit; and
    selecting a jaggedness-occurring area as a processing target area in the estimated image prior to the jaggedness occurrence, detecting a similar area that is a pixel area and similar to the processing target area, and then computing a weight according to the degree of similarity of each detected similar area to the processing target area, and detecting a corresponding area in the jaggedness-occurring image to the processing target area and the similar area, and then computing a corrected pixel value of the processing target area of the jaggedness-occurring image through a weighting/adding process to which the weight of a pixel value of the detected corresponding area is applied, in a weighting/adding unit.

12. The image processing method according to claim 10, further comprising:
inputting a luminance image generated from the jaggedness-occurring image and generating an estimated luminance image prior to the jaggedness occurrence, and
computing the weight based on the estimated luminance prior to the jaggedness occurrence, and executing a weighting/adding process of pixel values to which the weight for the luminance image generated from the jaggedness-occurring image is applied.

13. The image processing method according to claim 10, wherein the estimated image is generated prior to the jaggedness occurrence through a Bayes' estimation process to which preliminary learning data is applied.

14. The image processing method according to claim 10, wherein the estimated image is generated prior to the jaggedness occurrence through a smoothing process for the jaggedness-occurring image.

15. The image processing method according to claim 10, wherein the estimated image is generated prior to the jaggedness occurrence through a Bayes' estimation process to which statistical data of feature amounts expressing an edge is applied as preliminary learning data.

16. The image processing method according to claim 10, wherein the weighting/adding process is executed to which an NL-Means (Non-Local-Means) method is applied.

17. The image processing method according to claim 10, wherein the weighting/adding process is executed to which a Joint Bilateral Filter method is applied.

18. The image processing method according to claim 10, further comprising:
generating corrected color difference information by executing a correlation process in application of the Joint Bilateral Filter (JBF); and
setting a jaggedness-reduced luminance image having the computed corrected pixel value to a reference image.

19. The image processing method according to claim 10, further comprising:
blending the jaggedness-reduced luminance image having the computed corrected pixel value and a jaggedness-occurring luminance image generated based on a jaggedness-occurring image prior to correction in accordance with a weight corresponding to an edge of an image.

* * * * *